(12) United States Patent
Shimizu et al.

(10) Patent No.: US 8,312,895 B2
(45) Date of Patent: Nov. 20, 2012

(54) SOLENOID VALVE DEVICE

(75) Inventors: Tetsuya Shimizu, Anjo (JP); Kazuhiko Kato, Kariya (JP); Naoyuki Fukaya, Okazaki (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 420 days.

(21) Appl. No.: 12/656,457

(22) Filed: Jan. 29, 2010

(65) Prior Publication Data

US 2010/0243933 A1    Sep. 30, 2010

(30) Foreign Application Priority Data

Mar. 24, 2009 (JP) ................. 2009-072198

(51) Int. Cl.
*F15B 13/043* (2006.01)
*F16K 11/07* (2006.01)
*E03B 1/00* (2006.01)
*G05D 16/06* (2006.01)

(52) U.S. Cl. ............... 137/625.64; 137/625.66; 137/613

(58) Field of Classification Search .................. 137/613, 137/625.64, 625.66
See application file for complete search history.

(56) References Cited

U.S. PATENT DOCUMENTS

| | | | | |
|---|---|---|---|---|
| 3,046,951 A | * | 7/1962 | Freeborn ................. | 137/625.63 |
| 6,237,617 B1 | * | 5/2001 | Sturman et al. ................ | 137/1 |
| 2009/0301588 A1 | | 12/2009 | Shimizu et al. | |

FOREIGN PATENT DOCUMENTS

| | | |
|---|---|---|
| JP | U 57-150280 | 9/1982 |
| JP | Y2 61-14635 | 5/1986 |
| JP | A 2000-009027 | 1/2000 |
| JP | A 2000-213734 | 8/2000 |
| JP | A 2000-249330 | 9/2000 |
| JP | A 2002-168330 | 6/2002 |
| JP | A 2003-262330 | 9/2003 |
| JP | A-2004-176895 | 6/2004 |
| JP | A-2007-126974 | 5/2007 |
| JP | A-2008-180303 | 8/2008 |
| WO | WO 2009/145176 A1 | 12/2009 |

OTHER PUBLICATIONS

International Search Report mailed Apr. 20, 2010 for PCT/JP2010/051240.

* cited by examiner

*Primary Examiner* — John Rivell
*Assistant Examiner* — Hailey K Do
(74) *Attorney, Agent, or Firm* — Oliff & Berridge, PLC

(57) ABSTRACT

A solenoid valve device includes a solenoid valve that has a solenoid portion, a valve element that drivingly slides using electromagnetic force generated by the solenoid portion and regulates and outputs fluid pressure supplied from a fluid pressure source, a spring that biases the valve element in the sliding direction, and a spring chamber that accommodates the spring; an accumulating portion that accumulates operation fluid; an intake check valve that permits the flow of operation fluid from the accumulating portion to the spring chamber; and a discharge check valve that permits the flow of operation fluid from the spring chamber to an operation destination different from the accumulating portion.

11 Claims, 6 Drawing Sheets

|   |     | C1 | C2 | C3 | B1 | B2  | F1 |
|---|-----|----|----|----|----|-----|----|
|   | R   |    |    | O  |    | O   |    |
| D | 1st | O  |    |    |    | (O) | O  |
|   | 2nd | O  |    |    | O  |     |    |
|   | 3rd | O  | O  |    |    |     |    |
|   | 4th |    | O  |    | O  |     |    |

(O): ENGINE BRAKE IN OPERATION

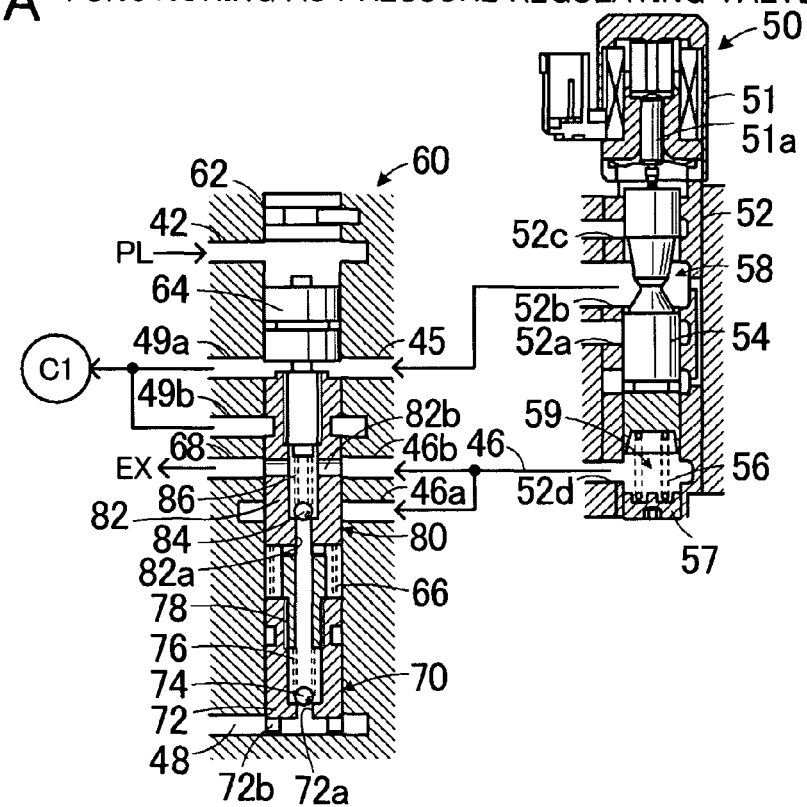
FIG. 5A FUNCTIONING AS PRESSURE REGULATING VALVE
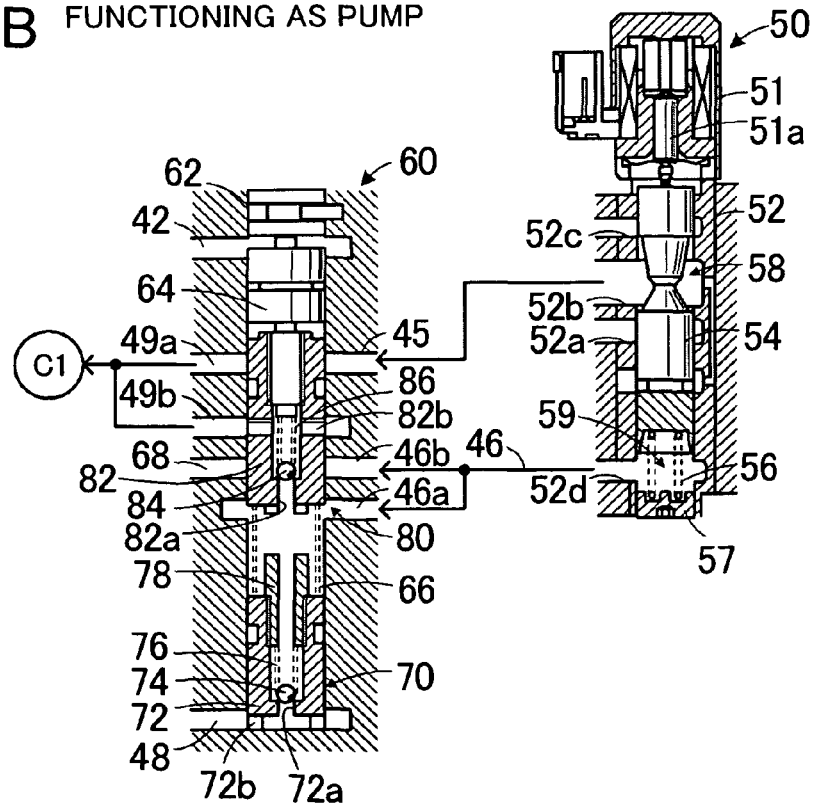
FIG. 5B FUNCTIONING AS PUMP FIG. 6A  FUNCTIONING AS PRESSURE REGULATING VALVE
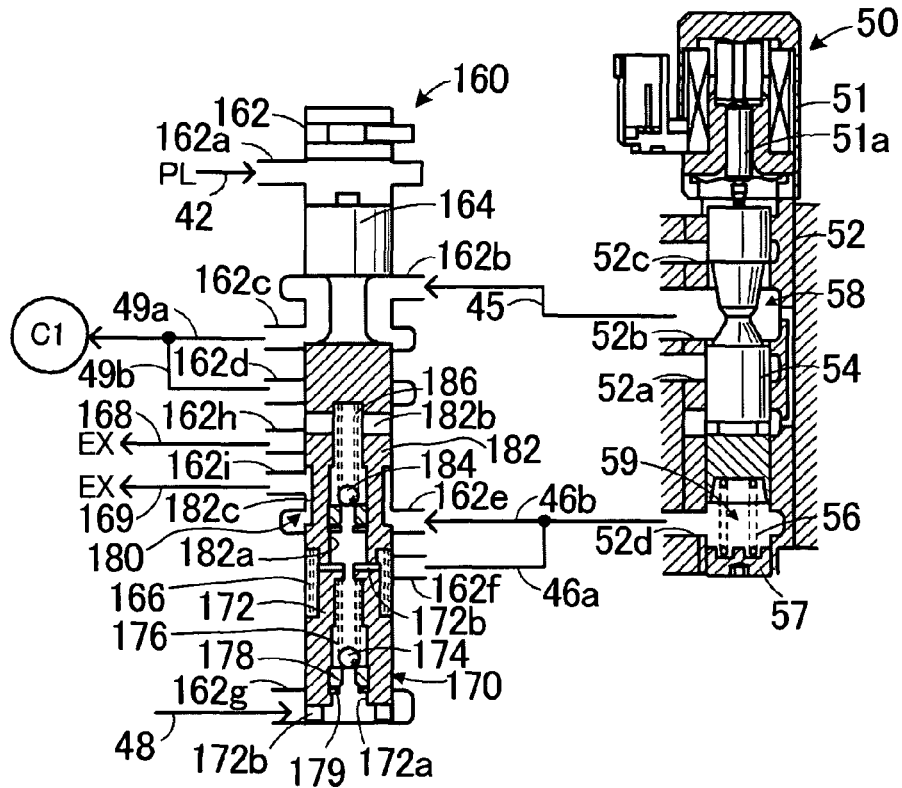
FIG. 6B  FUNCTIONING AS PUMP
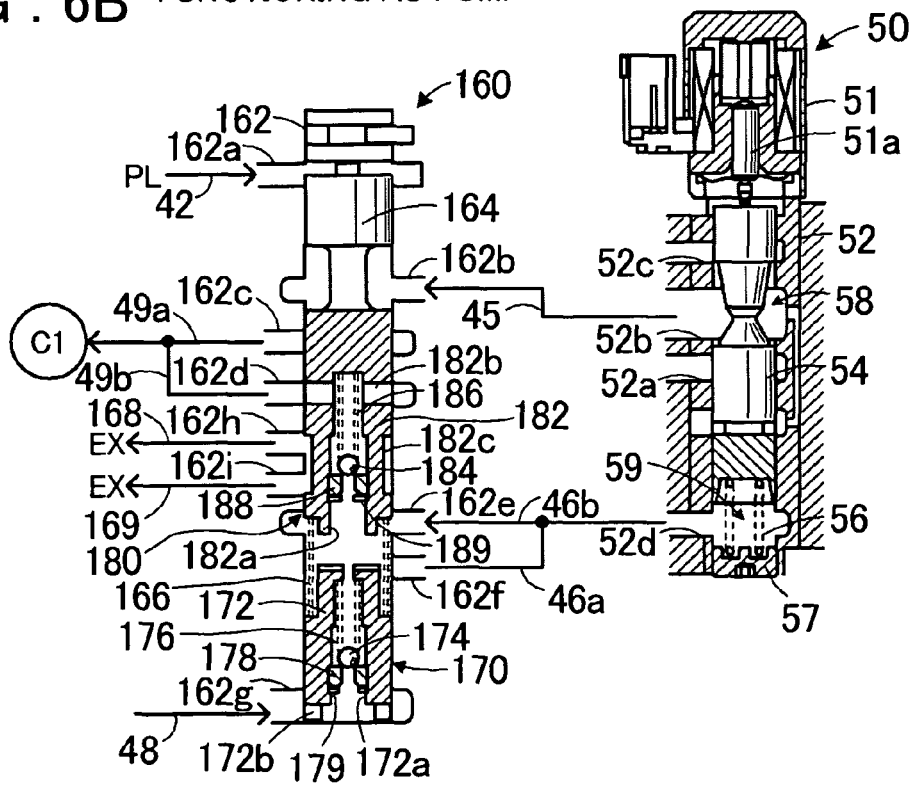

SOLENOID VALVE DEVICE

INCORPORATION BY REFERENCE

The disclosure of Japanese Patent Application No. 2009-072198 filed on Mar. 24, 2009 including the specification, drawings and abstract is incorporated herein by reference in its entirety.

BACKGROUND

The present invention relates to a solenoid valve device.

A conventional solenoid valve device of this type includes a sleeve, a spool, and a solenoid that moves the spool in the axial direction. The sleeve has a cylindrical valve chamber that is formed with an input port, an output port, a drain port, and a feedback port as various ports through which operation oil flows in and out. The spool is a shaft-like member accommodated in the valve chamber, and has a plurality of lands with a cylindrical shape whose outer diameter is generally equal to the inner diameter of the valve chamber, as well as a communication portion that has a cylindrical shape whose outer diameter is smaller than the outer diameter of the lands and communicates between the ports. (See Japanese Patent Application Publication No. JP-A-2004-176895, for example.)

An electromagnetic pump has also been proposed that pressure feeds fluid by repeated excitation and non-excitation of an electromagnetic coil. (See Japanese Patent Application Publication No. JP-A-2007-126974, for example.) This electromagnetic pump has a spring member that uses elastic force to press a piston that forms a pump chamber, and is also provided with an electromagnetic coil that generates a suction force in a direction opposite the elastic force of the spring member. Non-excitation (an off state) of the electromagnetic coil causes the elastic force of the spring member to move the piston, whereby fluid is intaken. Excitation (an on state) of the electromagnetic coil causes the suction force of the electromagnetic coil to move the piston, whereby the intaken fluid is discharged.

SUMMARY

However, there may be limited mounting space for a device that incorporates the pump in addition to the solenoid valve, for example, a device that incorporates a solenoid valve (linear solenoid) for regulating a clutch pressure in a hydraulic circuit that is used to turn on and off a clutch (brake) in an automatic transmission for a vehicle and also incorporates a pump for generating fluid pressure. Therefore, the device should be downsized as much as possible.

A solenoid valve device of the present invention downsizes the overall device.

The solenoid valve device of the present invention employs the following to achieve the above.

A solenoid valve device of the present invention includes: a solenoid valve that has a solenoid portion, a valve element that drivingly slides using electromagnetic force generated by the solenoid portion and regulates and outputs fluid pressure supplied from a fluid pressure source, a spring that biases the valve element in the sliding direction, and a spring chamber that accommodates the spring; an accumulating portion that accumulates operation fluid; an intake check valve that permits the flow of operation fluid from the accumulating portion to the spring chamber; and a discharge check valve that permits the flow of operation fluid from the spring chamber to an operation destination different from the accumulating portion, wherein the spring chamber includes one inflow/outflow port through which operation fluid from the intake check valve enters and operation fluid from the discharge check valve exits.

According to the solenoid valve device of the present invention, the spring chamber of the solenoid valve includes one inflow/outflow port through which operation fluid from the intake check valve enters and operation fluid from the discharge check valve exits. Therefore, one solenoid portion can be used to function as both a pressure regulating valve and as a pump. Consequently, a more downsized device overall can be achieved compared to one that separately provides a pressure regulating valve and an electromagnetic pump.

In the solenoid valve device of the present invention described above, the valve element may have a hollow sleeve formed with an input port and an output port, and a spool that with the sleeve forms a pressure regulating chamber therebetween such that pressure regulation performed by sliding the spool inside the sleeve causes fluid pressure that is input from the input port to be output from the output port. The spring chamber may also be formed as a space cut off from the pressure regulating chamber. Thus, one sleeve and spool can impart function as a pressure regulating valve and as a pump, which enables further downsizing of the device.

The solenoid valve device of the present invention may further include: a switching valve that switches between a first state that drains operation fluid inside the spring chamber, and a second state that prohibits the drainage of operation fluid inside the spring chamber, wherein the discharge check valve is built into the switching valve. Thus, further downsizing of the device can be achieved. When the solenoid valve functions as a pressure regulating valve, the switching valve is used to drain operation fluid inside the spring chamber, which can prevent operation fluid from remaining inside the spring chamber and having an adverse impact on pressure regulating precision. In the solenoid valve device of the present invention according to this aspect, the switching valve may include: a hollow portion that is connected to an output flow passage through which operation fluid output from the valve element of the solenoid valve flows, a spring chamber flow passage that is connected to the inflow/outflow port, an operation destination flow passage that is connected to the operation destination, and a drain flow passage that drains operation fluid inside the spring chamber; a spool that slides inside the hollow portion; and the discharge intake valve disposed inside the hollow portion. When the spool is in a first position, as the first state, the output flow passage communicates with the operation destination flow passage, communication between the spring chamber flow passage and the operation destination flow passage is cut off, and the spring chamber flow passage communicates with the drain flow passage. When the spool is in a second position, as the second state, communication between the output flow passage and the operation destination flow passage is cut off, communication between the spring chamber flow passage and the drain flow passage is cut off, and the spring chamber flow passage communicates with the operation destination flow passage through the discharge check valve. In such case, the spool and the discharge check valve may also be coaxially disposed in the switching valve.

In the solenoid valve device of the present invention according to an aspect where the spool and the discharge check valve are coaxially disposed, the discharge check valve may include: a body wherein an axial center thereof is formed with a center hole that communicates with the spring chamber flow passage, and the body is also formed with a through hole that communicates with the center hole in the radial direction;

and an opening/closing member that opens and closes the center hole. The switching valve cuts off communication between the through hole and the operation destination flow passage when the spool is in the first position, and communicates the through hole with the operation destination flow passage when the spool is in the second position. Thus, a relatively simple constitution enables the drainage of operation fluid inside the spring chamber through the switching valve. In the solenoid valve device of the present invention according to this aspect, the switching valve may communicate the spring chamber flow passage with the drain flow passage through the through hole when the spool is in the first position. In addition, the body of the discharge check valve may be formed with a reduced-diameter portion whose diameter is smaller than the diameter of the hollow portion, and the switching valve may communicate the spring chamber flow passage with the drain flow passage through the reduced-diameter portion when the spool is in the first position. Furthermore, in the solenoid valve device of the present embodiment according to these aspects, the discharge check valve may be formed such that the body integratedly operates with the spool. In such case, the body of the discharge check valve may be integratedly cast with the spool, or the discharge check valve may be installed by threadedly fastening the body to the spool and clamping a threadedly fastened portion.

In the solenoid valve device of the present invention according to an aspect where the discharge check valve is formed such that the body integratedly operates with the spool, the opening/closing member may be formed from a ball, and a spring that uses the spool as a spring receiver and closes the center hole by biasing the ball. Thus, the switching valve can be made smaller than one that provides a separate spring receiver.

The solenoid valve device of the present invention may further include: a switching valve that switches between a first state that drains operation fluid inside the spring chamber, and a second state that prohibits the drainage of operation fluid inside the spring chamber, wherein the intake check valve and the discharge check valve are formed as separate from the solenoid valve and the switching valve. In the solenoid valve device of the present invention according to this aspect, the intake check valve and the discharge check valve may also be incorporated into a valve body.

BRIEF DESCRIPTION OF THE DRAWINGS

FIGS. 5A and 5B are structural diagrams that show an outline of the constitution of a switching valve 60;

FIGS. 6A and 6B are structural diagrams that show an outline of the constitution of a switching valve 160 according to a modification.

DETAILED DESCRIPTION OF EMBODIMENTS

Next, an embodiment will be used to describe a best mode for carrying out the present invention.

Figure 1:
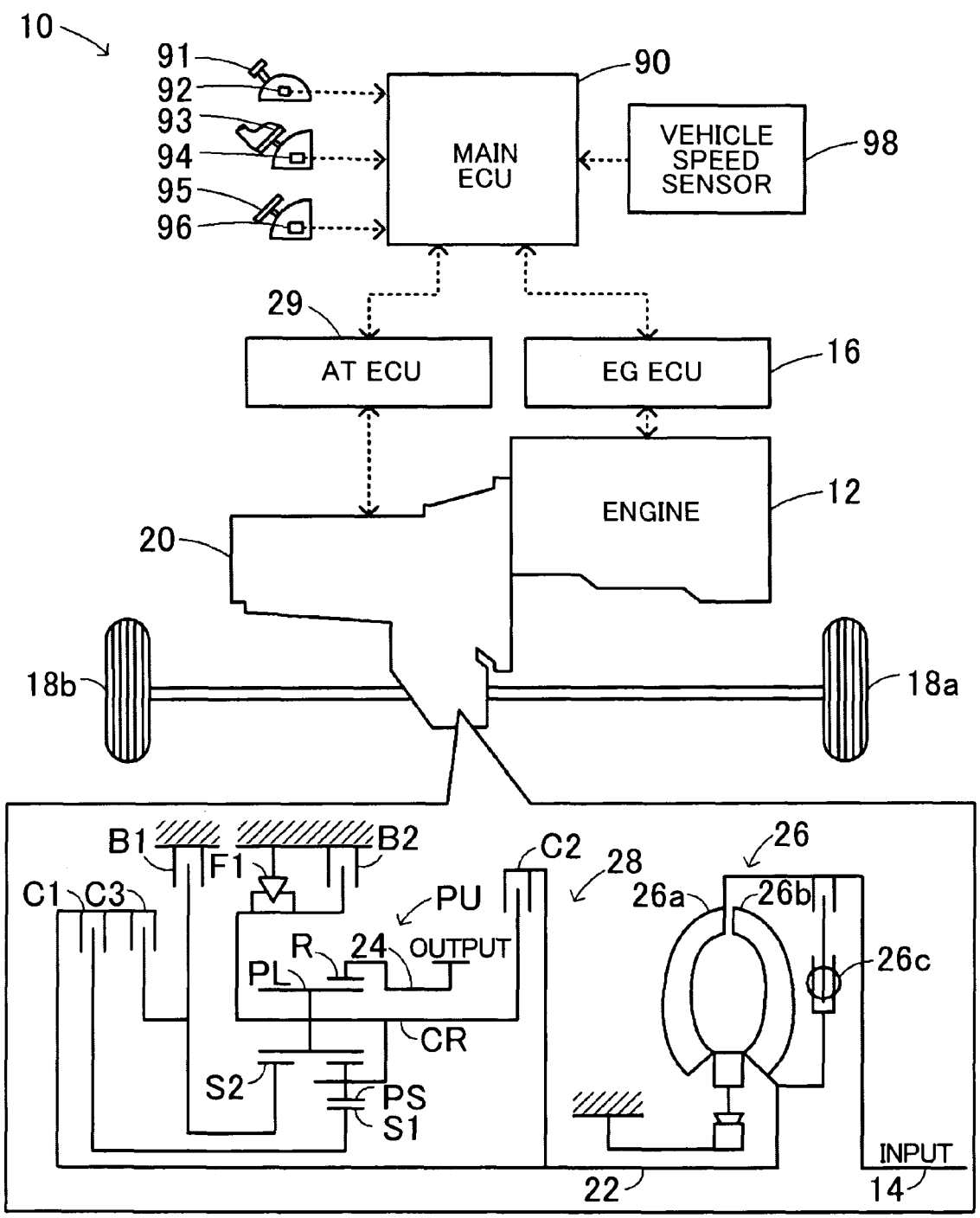
FIG. 1 is a structural diagram that shows an outline of the constitution of a power transmission apparatus 20 provided with a solenoid valve device serving as an embodiment of the present invention.
Figures 2, 3:
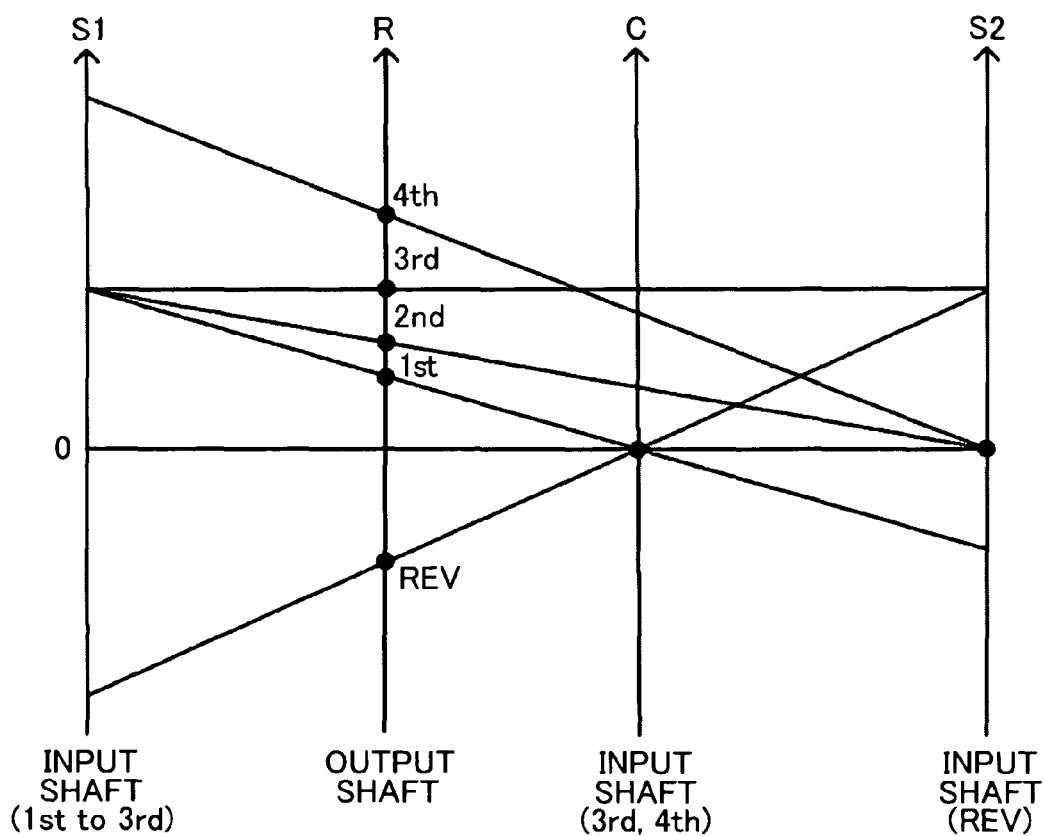
FIG. 2 is an operation chart for an automatic speed change mechanism 28.
FIG. 3 is a collinear diagram that shows relationships among rotational speeds of rotational elements in the automatic speed change mechanism 28.

FIG. 1 is a structural diagram that shows an outline of the constitution of a vehicle 10 installed with a power transmission apparatus 20 that is provided with a solenoid valve device serving as an embodiment of the present invention. FIG. 2 is an operation chart for an automatic speed change mechanism 28.

As shown in the figures, the power transmission apparatus 20 of the embodiment is structured so as to be installed in a front-engine, front-wheel-drive (FF) type vehicle 10. The power transmission apparatus 20 includes a torque converter 26 with a lock-up clutch, the automatic speed change mechanism 28, and an automatic transmission electronic control unit (AT ECU) 29 that controls the overall apparatus. The torque converter 26 amplifies torque and transmits power from an engine 12, which is subjected to an operation control executed by an engine electronic control unit (EG ECU) 16. The automatic speed change mechanism 28 changes the speed of power from the torque converter 26 and transmits such power to wheels 18a, 18b. The AT ECU 29 is communicably connected to the EG ECU 16 and a main electronic control unit (main ECU) 90 that controls the overall vehicle, and exchanges control signals and data pertaining to operating conditions. Note that the main ECU 90 is input with a shift position SP from a shift position sensor 92 that detects an operation position of a shift lever 91; and accelerator opening Acc from an accelerator pedal position sensor 94 that detects a depression amount of an accelerator pedal 93; a brake switch signal BSW from a brake switch 96 that detects depression of a brake pedal 95; and a vehicle speed V from a vehicle speed sensor 98.

The torque converter 26 includes a pump impeller 26a, which is connected to a crankshaft 14 of the engine 12, and a turbine runner 26b, which is connected to an input shaft 22 of the automatic speed change mechanism 28 and disposed facing the pump impeller 26a. The torque converter 26 transmits torque by the pump impeller 26a converting engine torque into a flow of operation oil, and the turbine runner 26b converting this flow of operation oil into torque for the input shaft 22. The torque converter 26 also has a built-in lock-up clutch 26c, and engagement of the lock-up clutch 26c directly connects the crankshaft 14 of the engine 12 and the input shaft 22 of the automatic speed change mechanism 28 so that engine torque is directly transmitted.

The automatic speed change mechanism 28 has a planetary gear unit PU; three clutches C1, C2, C3; two brakes B1, B2; and a one-way clutch F1. The planetary gear unit PU is structured as a Ravigneaux type planetary gear mechanism, and has two sun gears S1, S2 with external teeth; a ring gear R with internal teeth; a plurality of short pinion gears PS that mesh with the sun gear S1; a plurality of long pinion gears PL that mesh with the sun gear S2 and the plurality of short pinion gears PS, and also mesh with the ring gear R; and a carrier CR that is connected to and also rotatably and revolvably holds the plurality of short pinion gears PS and the plurality of long pinion gears PL. The sun gear S1 is connected to the input shaft 22 through the clutch C1. The sun gear S2 is connected to the input shaft 22 through the clutch C3, and the rotation of the sun gear S2 is permitted or held stationary by the brake B1. The ring gear R is connected to an output shaft 24. The carrier CR is connected to the input shaft 22 through the clutch C2. The rotation of the carrier CR is restricted to one direction by the one-way clutch F1, and also permitted or held stationary by the brake B2, which is provided in parallel with the one-way clutch F1. Note that power output to the output shaft 24 is transmitted to the wheels 18a, 18b through a counter gear and a differential gear not shown in the figures.

As shown in the operation chart of FIG. 2, the automatic speed change mechanism 28 can switch among first to fourth forward speeds and one reverse speed by combinations of engaging and disengaging the clutches C1 to C3 and the brakes B1, B2. FIG. 3 is a collinear diagram that shows relationships among rotational speeds of the sun gears S1, S2, the ring gear R, and the carrier CR at each shift speed of the automatic speed change mechanism 28.

Figure 4:
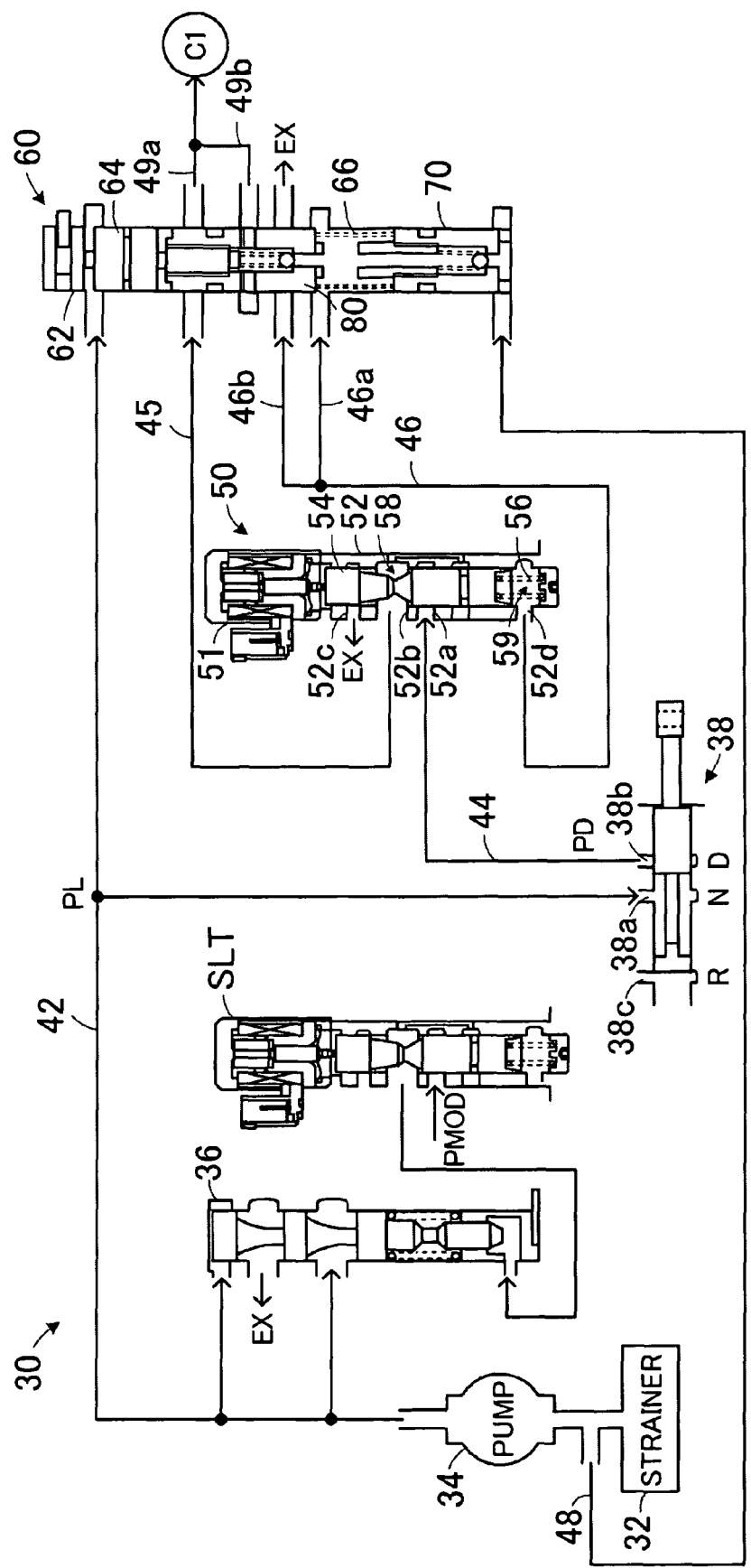
FIG. 4 is a structural diagram that shows an outline of the constitution of a hydraulic circuit 30.

Engaging and disengaging of the clutches C1 to C3 and the brakes B1, B2 of the automatic speed change mechanism 28 is performed by a hydraulic circuit 30. FIG. 4 is a structural diagram that shows an outline of the constitution of the hydraulic circuit 30. FIGS. 5A and 5B are structural diagrams that mainly show an outline of the constitution of a solenoid valve 50 and a switching valve 60. As shown the figures, the hydraulic circuit 30 includes: a mechanical oil pump 34, a regulator valve 36, a linear solenoid SLT, a manual valve 38, a solenoid valve 50, and a switching valve 60. The mechanical oil pump 34 pressure feeds operation oil through a strainer 32 based on power from the engine 12. The regulator valve 36 regulates operation oil pressure fed from the mechanical oil pump 34 to generate a line pressure PL. The linear solenoid SLT regulates a modulator pressure PMOD that is generated from the line pressure PL through a modulator valve (not shown) and outputs the modulator pressure PMOD as a signal pressure so as to drive the regulator valve 36. The manual valve 38 is formed with an input port 38a that is input with the line pressure PL, a Drive-position (D-position) output port 38b, and a Reverse-position (R-position) output port 38c, and the like. The manual valve 38 opens and closes each port in association with the operation of a shift lever 91. The solenoid valve 50 functions as a pressure regulating valve that is input with operation oil output from the D-position output port 38b of the manual valve 38 and regulates pressure by discharge to a first drain port 52c. The solenoid valve 50 also functions as an electromagnetic pump that intakes operation oil from an intake oil passage 48 between the strainer 32 and the mechanical oil pump 34, and discharges such operation oil. The switching valve 60 switches between the following two states: a state that causes the solenoid valve 50 to function as a pressure regulating valve to deliver hydraulic pressure to the clutch C1; and a state that causes the solenoid valve 50 to function as an electromagnetic pump to deliver hydraulic pressure from the electromagnetic pump to the clutch C1. Note that FIG. 4 only shows the hydraulic system of the clutch C1, and does not show the hydraulic systems for the clutches C2, C3 or the brakes B1, B2 because they are not central to the present invention. These hydraulic systems may be configured using common linear solenoids or the like.

As shown in FIG. 5, the solenoid valve 50 is structured as a linear solenoid valve formed from a solenoid portion 51, a sleeve 52, a spool 54, and a spring 56. The solenoid portion 51 drives a plunger 51a by generating a suction force using a magnetic circuit, which is formed by applying an electric current to a coil. The sleeve 52 is hollow and formed with an input port 52a, an output port 52b, the first drain port 52c, and a second drain port 52d. The spool 54 slides inside the sleeve 52 due to driving of the plunger 51a of the solenoid portion 51, and forms a pressure regulating chamber 58 that enables and cuts off communication between the input port 52a, the output port 52b, and the first drain port 52c. The spring 56 is disposed in a spring chamber 59 that is spatially cut off from the pressure regulating chamber 58 and communicates with the second drain port 52d, and biases the spool 54 from a side opposite the solenoid portion 51.

As shown in FIG. 5, the switching valve 60 includes a spool 64, an intake check valve 70, a discharge check valve 80, and a spring 66. The spool 64 slides inside a cylindrical cavity 62 that is connected to the following: a line pressure oil passage 42 connected to the mechanical oil pump 34; an output port oil passage 45 connected to the output port 52b of the solenoid valve 50; clutch oil passages 49a, 49b connected to the clutch C1; the intake oil passage 48 between the mechanical oil pump 34 and the strainer 32; spring chamber oil passages 46a, 46b connected to the spring chamber 59 (second drain port 52d) of the solenoid valve 50; and a drain oil passage 68. The intake check valve 70 is disposed inside the cylindrical cavity 62. The discharge check valve 80 is similarly disposed inside the cylindrical cavity 62, and connected by threaded fastening to the spool 64. The spring 66 biases the spool 64. In the switching valve 60, the spool 64, the discharge check valve 80, and the intake check valve 70 are arranged in that order, with the spring 66 provided between the discharge check valve 80 and the intake check valve 70. The spring 66 thus uses the intake check valve 70 as a spring receiver, and biases the spool 64 through the discharge check valve 80. Note that the cylindrical cavity 62 may be directly formed in the valve body or formed using a separate member.

The intake check valve 70 includes: a hollow cylindrical body 72 whose axial center is formed with a center hole 72a having large diameter and small diameter steps; a ball 74 that is inserted from the large diameter side into the center hole 72a; a spring 76 that presses the ball 74 against the body 72; and a hollow cylindrical spring receiver 78 that is connected by threaded fastening from the large diameter side to the center hole 72a of the body 72, and receives the spring 78 on an end surface. When there is positive pressure downstream, the biasing force of the spring 76 causes the ball 74 to block the center hole 72a to close the valve. When there is negative pressure downstream, contraction of the spring 76 unblocks the center hole 72a to open the valve. Note that a connecting portion of the body 72 and the spring receiver 78 is clamped from an outer surface toward a diameter reducing direction so that the connection does not weaken.

The discharge check valve 80 includes: a hollow cylindrical body 82 wherein the axial center thereof is formed with a center hole 82a having large diameter and small diameter steps, and the body 82 is also formed with a through hole 82b that communicates with the center hole 82a in the radial direction; a ball 84 that is inserted from the large diameter side into the center hole 82a; and a spring 86 that uses the spool 64 threadedly fastened from the large diameter side to the center hole 82a of the body 82 as a spring receiver, and presses the ball 84 against the body 82. When there is positive pressure downstream, the biasing force of the spring 86 causes the ball 84 to block the center hole 82a to close the valve. When there is negative pressure downstream, contraction of the spring 86 unblocks the center hole 82a to open the valve. Note that a connecting portion of the body 82 and the spool 64 is clamped from an outer surface toward a diameter reducing direction so that the connection does not weaken.

When the line pressure PL is input to the line pressure oil passage 42, in the switching valve 60 contraction of the spring 66 causes the spool 64 and the discharge check valve 80 to move downward in the figure. Consequently, the output port oil passage 45 connects with the clutch oil passage 49a, and the spring chamber oil passage 46a connects with the drain oil passage 68 through the through hole 82b (see FIG. 5A). Causing the solenoid valve 50 to function as a pressure regulating valve thus allows operation oil output from the output port 52b as the result of pressure regulation to act on the clutch C1. When the line pressure PL is not input to the line pressure oil passage 42, in the switching valve 60 extension of the spring 66 due to its biasing force causes the spool 64 and the discharge check valve 80 to move upward in the figure. Consequently, the connection between the output port oil passage 45 and the clutch oil passage 49a is cut off, the connection between the spring chamber oil passage 46b and the clutch oil passage 49b is cut off, the intake oil passage 48 is connected to the spring chamber oil passage 46a through the intake check valve 70 (through hole 72b, center hole 72a), and the spring chamber oil passage 46a is connected to the clutch oil passage 49b through the discharge check valve 80 (center hole 82a, through hole 82b) (see FIG. 5B). In the solenoid valve 50, when driving of the solenoid portion 51 is stopped following a state in which the spool 54 is pushed out by driving of the solenoid portion 51, the spring 56 presses the spool 54 back. Therefore, negative pressure is generated inside the spring chamber 59, which opens the intake check valve 70 and closes the discharge check valve 80. Consequently, operation oil is guided to the spring chamber 59 through the intake oil passage 48, the intake check valve 70, and the spring chamber oil passage 46a in that order. Subsequent driving of the solenoid portion 51 pushes out the spool 54. Therefore, positive pressure is generated inside the spring chamber 59, which closes the intake check valve 70 and opens the discharge check valve 80. Consequently, operation oil guided to the spring chamber 59 is delivered to the clutch C1 through the spring chamber oil passage 46a, the discharge check valve 80, and the clutch oil passage 49b in that order. By thus repeatedly driving and stopping the solenoid portion 51 in a constant cycle, the solenoid valve 50 functions as an electromagnetic pump and can supply operation oil to the clutch C1.

Furthermore, when the vehicle 10 of the embodiment thus formed is running with the shift lever 91 in the Drive (D) running position, the engine 12 automatically stops when all preset automatic stop conditions are satisfied. Such automatic stop conditions include the vehicle speed V being zero, the accelerator off, and the brake switch signal BSW on. Once the engine 12 automatically stops, if preset automatic start conditions such as the brake switch signal BSW being off are subsequently satisfied, the automatically stopped engine 12 is automatically started.

When the automatic stop conditions are satisfied in the vehicle 10 of the embodiment and the engine 12 automatically stops, the mechanical oil pump 34 also stops accordingly. Therefore, the line pressure PL escapes and the spool 64 of the switching valve 60 cuts off the connection between the output port oil passage 45 and the clutch oil passage 49a, cuts off the connection between the spring chamber oil passage 46b and the clutch oil passage 49b, connects the intake oil passage 48 with the spring chamber oil passage 46a through the intake check valve 70, and connects the spring chamber oil passage 46a with the clutch oil passage 49b through the discharge check valve 80. Thus, the solenoid valve 50 functioning as an electromagnetic pump causes hydraulic pressure to act on the clutch C1. When the automatic start conditions are subsequently satisfied and the engine 12 automatically starts, the mechanical oil pump 34 also operates accordingly. Therefore, the line pressure PL is delivered and the spool 64 of the switching valve 60 connects the output port oil passage 45 with the clutch oil passage 49a, and connects the spring chamber oil passage 46b with the drain oil passage 68. Thus, the solenoid valve 50 functioning as a pressure regulating valve causes complete engagement of the clutch C1 to start off the vehicle. At such time, the switching valve 60 connects the spring chamber oil passage 46b with the drain oil passage 68 so that operation oil remaining inside the spring chamber 59 is drained. There is thus no adverse impact on the pressure regulating precision of the solenoid valve 50. By making the solenoid valve 50 function as an electromagnetic pump so that hydraulic pressure acts on the clutch C1 while the engine 12 is automatically stopped, the clutch C1 can be rapidly engaged when the solenoid valve 50 functions as a pressure regulating valve immediately after the engine 12 automatically restarts. Therefore, the vehicle can smoothly start off. Note that in this embodiment, the solenoid valve 50 is designed with a pressure feeding performance as an electromagnetic pump capable of replenishing only an amount of operation oil leakage from a seal ring or the like provided between the piston and drum of the clutch C1.

According to the solenoid valve device of the embodiment described above, the second drain port 52d, which communicates with the spring chamber 59 of the solenoid valve 50 that functions as a pressure regulating valve, is connected to the spring chamber oil passage 46a. The spring oil passage 46a is further connected to the intake oil passage 48 through the intake check valve 70 and connected to the clutch oil passage 49b through the discharge check valve 80. Therefore, the solenoid valve 50 can use the spring chamber 59 to also function as an electromagnetic pump. Consequently, a smaller hydraulic circuit 30 can be achieved compared to one that separately provides a pressure regulating valve and an electromagnetic pump, thus achieving a more downsized device. When the solenoid valve 50 functions as a pressure regulating valve, that is, when the mechanical oil pump 34 drives to generate the line pressure PL, the switching valve 60 causes the spring chamber oil passage 46b to connect to the drain oil passage 68 so as to drain operation oil inside the spring chamber 59. It is thus possible to prevent operation oil from remaining inside the spring chamber 59 and having an adverse impact on pressure regulating precision. In addition, because the intake check valve 70 and the discharge check valve 80 that connect to the spring chamber 59 (second drain port 52d) of the solenoid valve 50 are built into the switching valve 60, the device can be further downsized.

In the solenoid valve device of the embodiment, a switching valve 60 is provided in which the cylindrical cavity 62 is connected to the line pressure oil passage 42, the output port oil passage 45, the clutch oil passages 49a, 49b, the intake oil passage 48, the spring chamber oil passages 46a, 46b, and the drain oil passage 68, and communication and non-communication among these oil passages is switched by the spool 64. However, the present invention is not limited to this example, and a switching valve 160 illustrated in FIG. 6 may be used. As shown in the figure, the switching valve 160 is formed from a sleeve 162, a spool 164 that slides in the axial direction inside the sleeve 162 and is integrated with a discharge check valve 180, a spring 166 that biases the spool 164 in the axial direction, and an intake check valve 170 installed inside the sleeve 162. The sleeve 162 is formed with the following ports: a signal pressure input port 162a that is connected to the line pressure oil passage 42; an input port 162b that is connected to the output port oil passage 45; output ports 162c, 162d that are connected to the clutch oil passage 49; an input port 162e and an output port 162f that are connected to the spring chamber oil passages 46b, 46a, respectively; an input port 162g that is connected to the intake oil passage 48; and drain ports 162h, 162i that are connected to the drain oil passages 168, 169, respectively.

The intake check valve 170 includes: a hollow cylindrical body 172 whose axial center is formed with a center hole 172a having large diameter and small diameter steps; a spring 176 that is inserted from the large diameter side and uses a step of the center hole 172a as a spring receiver; a ball 174 that is inserted from the large diameter side into the center hole 172a after insertion of the spring 176; a hollow cylindrical ball receiver 178 that is inserted into the center hole 172a and receives the ball 174; and a snap ring 179 for fixing the ball receiver 178 to the body 172. Meanwhile, the discharge check valve 180 includes: a body 182 that is integratedly cast with the spool 164, wherein the axial center of the body 182 is formed with a center hole 182a having a recess shape, and the body 182 is also formed with a through hole 182b that runs through the center hole 182a in the radial direction; a spring 186 that is inserted into the center hole 182a and uses the bottom of the center hole 182a as a spring receiver; a ball 184 that is inserted into the center hole 182a after insertion of the spring 186; a hollow cylindrical ball receiver 188 that is inserted into the center hole 182a and receives the ball 184; and a snap ring 189 for fixing the ball receiver 188 to the body 182. In addition, the body 182 of the discharge check valve 180 is formed with a reduced-diameter portion 182c of which a portion of the outer diameter is reduced.

When the line pressure PL is input to the signal pressure input port 162a, in the switching valve 160 described above contraction of the spring 166 due to the line pressure PL causes the spool 164 to move downward in the figure. Consequently, the input port 162b communicates with the output port 162c, and the input port 162e communicates with the drain port 162i through the reduced-diameter portion 182c. Therefore, the solenoid valve 50 functioning as a pressure regulating valve causes hydraulic pressure from the output port 52b to act on the clutch C1. At such time, operation oil remaining inside the spring chamber 59 is drained through the second drain port 52d, the spring chamber oil passage 46b, the input port 162e, the reduced-diameter portion 182c, and the drain port 162i in that order. There is thus no adverse impact on the pressure regulating precision of the solenoid valve 50. In addition, the body 172 of the intake check valve 170 is formed with a through hole 172b at a portion that contacts the body 182 of the discharge check valve 180. Operation oil remaining in a space between the intake check valve 170 and the discharge check valve 180 is thus also drained through the output port 162f, the spring chamber oil passage 46a, 46b, the input port 162e, the reduced-diameter portion 182c, and the drain port 162i in that order. When the line pressure PL is not input to the signal pressure input port 162a, extension of the spring 166 due to its biasing force causes the spool 164 to move upward in the figure. Consequently, communication between the input port 162b and the output port 162c is cut off, the input port 162g communicates with the output port 162f through the intake check valve 170 (center hole 172a, through hole 172b), the input ports 162e, 162f communicate with the output port 162d through the discharge check valve 180 (center hole 182a, through hole 182b), and communication between the input port 162e and the drain ports 162h, 162i is cut off. Therefore, the solenoid valve 50 functioning as an electromagnetic pump causes operation oil to be intaken by the spring chamber 59 through the input port 162g of the switching valve 160, the intake check valve 170, the output port 162f, and the spring chamber oil passage 46a in that order. The solenoid valve 50 functioning as an electromagnetic pump also causes the intaken operation oil to be delivered to the clutch C1 through the spring chamber oil passages 46b, 46a, the input ports 162e, 162f of the switching valve 160, the discharge check valve 180, and the output port 162d in that order.

Figure 7:
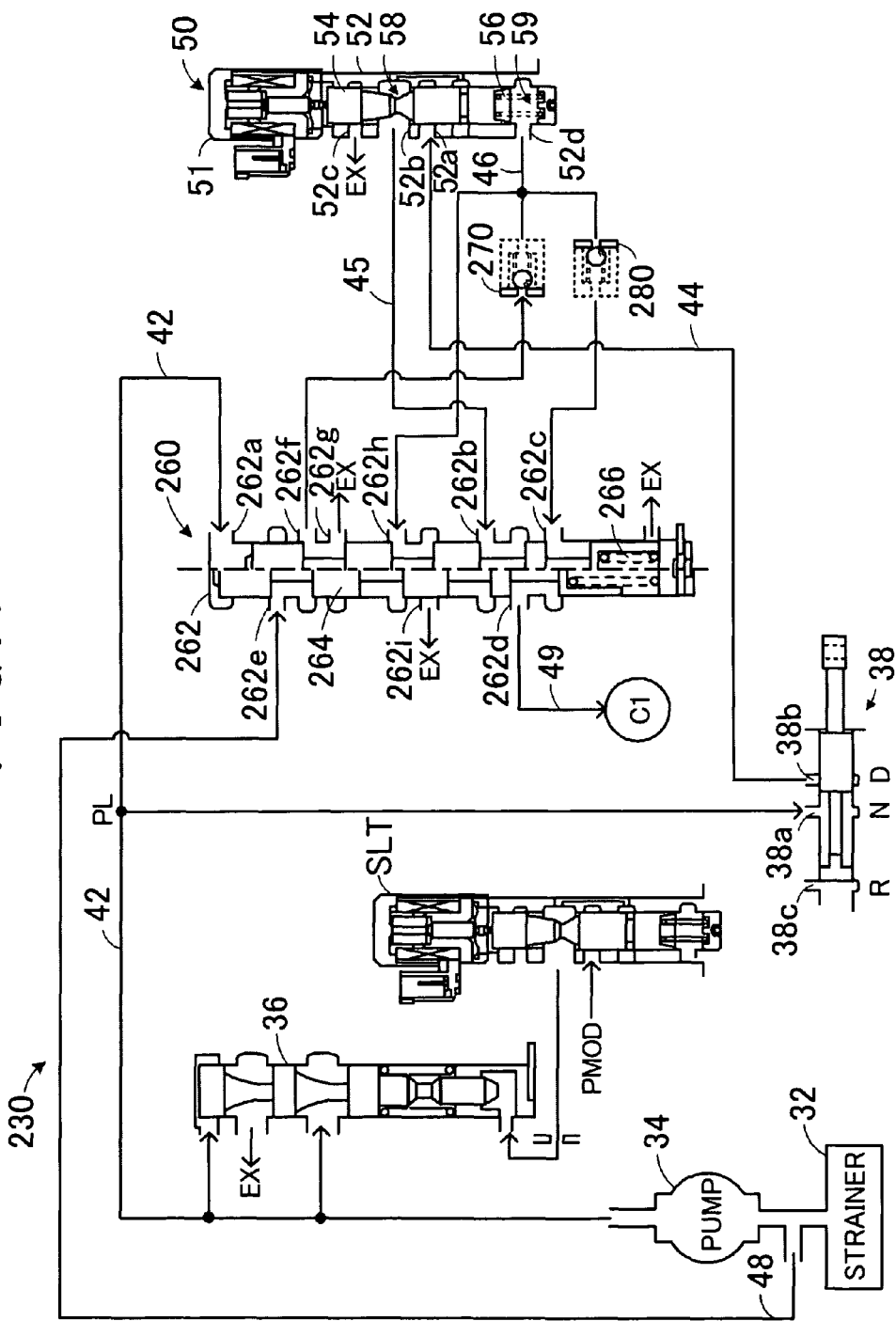
FIG. 7 is a structural diagram that shows an outline of the constitution of a hydraulic circuit 230 according to a modification.

In the solenoid valve device of the embodiment, the intake check valve 70 and the discharge check valve 80 are built into the switching valve 60. However, the discharge check valve may be built into the switching valve while the intake check valve is incorporated into a valve body other than the switching valve, or the intake check valve built into the switching valve while the discharge check valve is incorporated into a valve body other than the switching valve, or both the intake check valve and the discharge check valve incorporated into a valve body other than the switching valve. FIG. 7 shows an example of a hydraulic circuit 230 in which the intake check valve and the discharge check valve are incorporated into a valve body. An intake check valve 270 and a discharge check valve 280 are structured such that a ball and a spring are disposed in a cylindrical housing, and incorporated by fitting into a recess portion formed in the valve body. The switching valve 260 is formed from a sleeve 262, a spool 264 that slides in the axial direction inside the sleeve 262, and a spring 266 that biases the spool 264 in the axial direction. The sleeve 262 is formed with the following ports: a signal pressure input port 262a that is connected to the line pressure oil passage 42; an input port 262b that is connected to the output port oil passage 45; an input port 262c that is connected to the spring chamber oil passage 46 through the discharge check valve 280; an output port 262d that is connected to the clutch oil passage 49; an input port 262e that is connected to the intake oil passage 48; an output port 262f that is connected to the spring chamber oil passage 46 through the intake check valve 270; an input port 262h that is connected to the spring chamber oil passage 46; and a drain port 262i. When the line pressure PL is input to the signal pressure input port 262a, in the switching valve 260 contraction of the spring 266 causes the spool 264 to move to a position shown on the right-hand side of the valve in the figure. Consequently, the input port 262b communicates with the output port 262d, communication is cut off between the input port 262c and the output port 262d, and the input port 262h communicates with the drain port 262i. Therefore, the solenoid valve 50 functioning as a pressure regulating valve causes hydraulic pressure from the output port 52b to act on the clutch C1. At such time, operation oil remaining inside the spring chamber 59 is drained through the second drain port 52d, the spring chamber oil passage 46, the input port 262h, and the drain port 262i in that order. There is thus no adverse impact on the pressure regulating precision of the solenoid valve 50. When the line pressure PL is not input to the signal pressure input port 262a, extension of the spring 266 due to its biasing force causes the spool 264 to move to a position shown on the left-hand side of the valve in the figure. Consequently, communication between the input port 262b and the output port 26dc is cut off, the input port 262c communicates with the output port 262d, the input port 262e communicates with the output port 262f, and communication between the input port 262h and the drain port 262i is cut off. Therefore, the solenoid valve 50 functioning as an electromagnetic pump causes operation oil to be intaken by the spring chamber 59 through the intake oil passage 48, the input port 262e of the switching valve 60, the output port 262f, the intake check valve 270, and the spring chamber oil passage 46 in that order. The solenoid valve 50 functioning as an electromagnetic pump also causes the intaken operation oil to be delivered to the clutch C1 through the spring chamber oil passage 46, the discharge check valve 280, and the input ports 262c, 262d of the switching valve 60 in that order.

In the solenoid valve device of the embodiment, the switching valve 60 is driven using the line pressure PL. However, the switching valve 60 may be driven using a modulator pressure PMOD achieved by lowering the line pressure PL with a modulator valve (not shown). Alternatively, the line pressure PL or a modulator pressure may be supplied to the switching valve 60 through a solenoid valve, and the solenoid valve used to drive the switching valve 60.

In the solenoid valve device of the embodiment, the solenoid valve 50 is formed by combining a linear solenoid SLC1 that regulates the hydraulic pressure of the clutch C1 with an electromagnetic pump. However, the present invention is not limited to this example. The solenoid valve 50 may combine the linear solenoid SLT that drives the regulator valve 36 with an electromagnetic pump, or combine an on-off solenoid valve instead of a linear solenoid with the electromagnetic pump.

The embodiment incorporates a four-speed automatic speed change mechanism 28 with first to fourth forward speeds. However, the present invention is not limited to this example, and an automatic speed change mechanism with any number of speeds may be incorporated, such as an automatic speed change mechanism with two speeds, three speeds, or five or more speeds.

Here, the correspondence relation will be described between main elements in the embodiment and main elements of the invention as listed in the Disclosure of the Invention. In the embodiment, the solenoid portion 51 corresponds to a "solenoid portion"; the sleeve 52 and the spool 54 that form the pressure regulating chamber 58 to a "valve element"; the spring chamber 59 to a "spring chamber"; the intake oil passage 48 to a "reservoir portion"; the intake check valve 70 to an "intake check valve"; the discharge check valve 80 to a "discharge check valve"; and the second drain port 52d to an "inflow/outflow port". The switching valve 60 corresponds to a "switching valve".

The above embodiment was used to describe a mode for carrying out the present invention. However, the present invention is not particularly limited to such an example, and may obviously be carried out using various embodiments without departing from the scope of the present invention.

The present invention may be used in the automobile industry.

What is claimed is:

1. A solenoid valve device comprising:
    a solenoid valve that has a solenoid portion, a valve element that drivingly slides using electromagnetic force generated by the solenoid portion and regulates and outputs fluid pressure supplied from a fluid pressure source, a spring that biases the valve element in the sliding direction, and a spring chamber that accommodates the spring;
    an accumulating portion that accumulates operation fluid;
    an intake check valve that permits the flow of operation fluid from the accumulating portion to the spring chamber;
    a discharge check valve that permits the flow of operation fluid from the spring chamber to an operation destination different from the accumulating portion, wherein the spring chamber includes one inflow/outflow port through which operation fluid from the intake check valve enters and operation fluid from the discharge check valve exits; and
    a switching value that switches between a first state that drains operation fluid inside the spring chamber, and a second state that prohibits the drainange of operation fluid inside the spring chamber, wherein
    the discharge check value is built into the switching value.

2. The solenoid valve device according to claim 1, wherein the switching valve comprises:
    a hollow portion that is connected to an output flow passage through which operation fluid output from the valve element of the solenoid valve flows, a spring chamber flow passage that is connected to the inflow/outflow port, an operation destination flow passage that is connected to the operation destination, and a drain flow passage that drains operation fluid inside the spring chamber;
    a spool that slides inside the hollow portion; and
    the discharge intake valve disposed inside the hollow portion, wherein
    when the spool is in a first position, as the first state, the output flow passage communicates with the operation destination flow passage, communication between the spring chamber flow passage and the operation destination flow passage is cut off, and the spring chamber flow passage communicates with the drain flow passage, and
    when the spool is in a second position, as the second state, communication between the output flow passage and the operation destination flow passage is cut off, communication between the spring chamber flow passage and the drain flow passage is cut off, and the spring chamber flow passage communicates with the operation destination flow passage through the discharge check valve.

3. The solenoid valve device according to claim 2, wherein the spool and the discharge check valve are coaxially disposed in the switching valve.

4. The solenoid valve device according to claim 3, wherein the discharge check valve comprises:
    a body wherein an axial center thereof is formed with a center hole that communicates with the spring chamber flow passage, and the body is also formed with a through hole that communicates with the center hole in the radial direction; and
    an opening/closing member that opens and closes the center hole, wherein
    the switching valve cuts off communication between the through hole and the operation destination flow passage when the spool is in the first position, and communicates the through hole with the operation destination flow passage when the spool is in the second position.

5. The solenoid valve device according to claim 4, wherein the switching valve communicates the spring chamber flow passage with the drain flow passage through the through hole when the spool is in the first position.

6. The solenoid valve device according to claim 4, wherein the body of the discharge check valve is formed with a reduced-diameter portion whose diameter is smaller than the diameter of the hollow portion, and
the switching valve communicates the spring chamber flow passage with the drain flow passage through the reduced-diameter portion when the spool is in the first position.

7. The solenoid valve device according to claim 4, wherein the discharge check valve is formed such that the body integratedly operates with the spool.

8. The solenoid valve device according to claim 7, wherein the body of the discharge check valve is integratedly cast with the spool.

9. The solenoid valve device according to claim 7, wherein the discharge check valve is installed by threadedly fastening the body to the spool and clamping a threadedly fastened portion.

10. The solenoid valve device according to claim 4, wherein
the opening/closing member is formed from a ball, and a spring that uses the spool as a spring receiver and closes the center hole by biasing the ball.

11. The solenoid valve device according to claim 1, wherein
the intake check valve is built into the switching valve.

* * * * *